United States Patent
Noguchi et al.

(10) Patent No.: US 11,746,920 B2
(45) Date of Patent: Sep. 5, 2023

(54) SWITCHING VALVE DEVICE

(71) Applicants: Eagle Industry Co., Ltd., Tokyo (JP); KABUSHIKI KAISHA TOYOTA JIDOSHOKKI, Aichi (JP)

(72) Inventors: Hiroshi Noguchi, Tokyo (JP); Hiroyuki Iwanaga, Tokyo (JP); Naoki Nishimura, Tokyo (JP); Akitaka Matsuzaki, Tokyo (JP); Fuminobu Enokijima, Aichi (JP)

(73) Assignees: EAGLE INDUSTRY CO., LTD.; KABUSHIKI KAISHA TOYOTA JIDOSHOKKI

( * ) Notice: Subject to any disclaimer, the term of this patent is extended or adjusted under 35 U.S.C. 154(b) by 0 days.

(21) Appl. No.: 17/591,564

(22) Filed: Feb. 2, 2022

(65) Prior Publication Data

US 2022/0260169 A1 Aug. 18, 2022

(51) Int. Cl.
*F16K 27/02* (2006.01)
*F16K 11/044* (2006.01)
*F25B 41/26* (2021.01)
*F16K 31/42* (2006.01)

(52) U.S. Cl.
CPC ........ *F16K 27/0263* (2013.01); *F16K 11/044* (2013.01); *F16K 31/423* (2013.01); *F25B 41/26* (2021.01); *Y10T 137/86839* (2015.04)

(58) Field of Classification Search
CPC .................... F25B 41/26; Y10T 137/86839
See application file for complete search history.

(56) References Cited

U.S. PATENT DOCUMENTS

| | | | | |
|---|---|---|---|---|
| 4,805,666 A | * | 2/1989 | Araki | F25B 41/26 137/599.08 |
| 5,934,097 A | * | 8/1999 | Karl | F25B 41/20 62/324.6 |
| 6,158,466 A | * | 12/2000 | Riefler | F25B 41/26 137/625.43 |
| 6,823,897 B2 | * | 11/2004 | Hirota | F16K 31/423 137/885 |
| 6,860,294 B2 | * | 3/2005 | Hirota | F16K 31/423 137/596.17 |
| 6,976,500 B2 | * | 12/2005 | Lorenz-Bornert | F16K 11/048 137/599.11 |
| 2004/0226618 A1 | * | 11/2004 | Koyama | F25B 41/26 137/625.43 |

FOREIGN PATENT DOCUMENTS

JP 2015-108385 6/2015 ............ F16K 11/065

* cited by examiner

*Primary Examiner* — Robert K Arundale
(74) *Attorney, Agent, or Firm* — HAYES SOLOWAY P.C.

(57) ABSTRACT

A switching valve device for switching an intermediate flow path through which a fluid flows from an inlet to an outlet includes: a first valve which switches a flow path extending from the inlet to one of two flow paths; and a second valve which is provided on a downstream side of the first valve and switches the intermediate flow path by a differential pressure generated by depressurization in an external flow path Lout connected to the intermediate flow path connected to one of the two flow paths.

2 Claims, 6 Drawing Sheets

SWITCHING VALVE DEVICE

BACKGROUND OF THE INVENTION

Field of the Invention

The present invention relates to a switching valve device that switches a flow path through which a fluid flows.

Description of the Related Art

In various industrial fields, a fluid circuit in which a fluid supply source and a fluid actuator or a heat exchanger are connected in an annular shape by a flow path is used. In such a fluid circuit, a switching valve device for switching a flow path through which a working fluid flows is provided, and a plurality of functions may be realized by one fluid circuit.

For example, a switching valve device of JP 2015-108385 A (Page 8, FIG. 1) switches a fluid circuit constituting a heat pump by using the heat of vaporization and the heat of condensation of a heat medium. The heat pump includes a compressor, a first heat exchanger for an outdoor purpose, an expansion valve serving as a depressurizing device for expanding a heat medium, and a second heat exchanger for an indoor purpose, and the first heat exchanger, the expansion valve, and the second heat exchanger are connected in series. A cold air operation and a warm-up operation are switched when the switching valve device switches the heat exchanger connected right below the compressor to the first heat exchanger and the second heat exchanger.

The switching valve device can switch the flow path by a first solenoid valve and a second solenoid valve in which valve bodies are arranged in parallel in a housing provided with a discharge side high-pressure port for a compressor, a suction side low-pressure port for a compressor, an outdoor input/output port, and an indoor input/output port. When the first solenoid valve is turned off, the discharge side high-pressure port and the indoor input/output port do not communicate with each other and the indoor input/output port and the suction side low-pressure port communicate with each other. Then, when the first solenoid valve is turned on, the discharge side high-pressure port and the indoor input/output port communicate with each other and the indoor input/output port and the suction side low-pressure port do not communicate with each other. On the other hand, when the second solenoid valve is turned off, the discharge side high-pressure port and the outdoor input/output port do not communicate with each other and the outdoor input/output port and the suction side low-pressure port communicate with each other. Then, when the second solenoid valve is turned on, the discharge side high-pressure port and the outdoor input/output port communicate with each other and the outdoor input/output port and the suction side low-pressure port do not communicate with each other.

In a cold air operation mode, the first solenoid valve is turned off and the second solenoid valve is turned on so that the heat medium in the fluid circuit circulates from the compressor in order of the switching valve device, the outdoor heat exchanger, the expansion valve, the indoor heat exchanger, the switching valve device, and the compressor. On the other hand, in a warm-up operation mode, when the first solenoid valve is turned on and the second solenoid valve is turned off, the heat medium in the fluid circuit circulates from the compressor in order of the switching valve device, the indoor heat exchanger, the expansion valve, the outdoor heat exchanger, the switching valve device, and the compressor.

In the switching valve device of JP 2015-108385 A (Page 8, FIG. 1), the cold air operation mode and the warm-up operation mode can be switched by controlling the first solenoid valve and the second solenoid valve. Since it is necessary to control each solenoid valve moving the valve body when switching the flow path by using a unit using the plurality of solenoid valves, a problem arises in that such control becomes complicated and a structure becomes complicated.

In consideration of the above problems, the present invention is to provide a switching valve device capable of easily performing switching control with a simple structure.

SUMMARY OF THE INVENTION

In order to solve the above problems, a switching valve device according to the present invention is a switching valve device for switching an intermediate flow path through which a fluid flows from an inlet to an outlet, including: a first valve which switches a flow path extending from the inlet to one of two flow paths; and a second valve which is provided on a downstream side of the first valve and switches the intermediate flow path by a differential pressure generated by depressurization in an external flow path connected to the intermediate flow path connected to one of the two flow paths. According to the aforesaid features of the present invention, since a differential pressure is generated on the downstream side in response to the operation of switching the inlet side flow path of the first valve and the second valve is operated on the basis of the differential pressure to switch the intermediate flow path, it is possible to easily switch the intermediate flow path between the inlet side flow path and the outlet side flow path with a simple structure.

It may be preferable that the second valve is a poppet valve including a pair of valve seats which are disposed to face each other and a valve body which is movable to be brought into contact with one of the pair of valve seats and to be separated from remaining one of the pair of valve seats. According to this preferable configuration, since the valve body of the second valve receives a force in a valve closing direction by the high fluid pressure of the input flow path, it is possible to maintain a state in which the valve body is in contact with one valve seat.

It may be preferable that the valve body is provided with a pair of pressure receiving contact portions disposed to face each other and each including a pressure receiving surface and a contact surface provided on a back surface side of the pressure receiving surface and coming into contact with the valve seat. According to this preferable configuration, when the pressure receiving surface of the pressure receiving contact portion on the high pressure side receives the fluid pressure so that the contact surface of the pressure receiving contact portion comes into contact with one valve seat, the contact surface of the pressure receiving contact portion on the low pressure side is separated from the other valve seat and hence the flow path toward the outlet can be formed between the contact surface of the pressure receiving contact portion on the low pressure side and the other valve seat.

It may be preferable that the second valve includes an urging device that urges the contact surface of the pressure receiving contact portion toward at least one of the pair of valve seats. According to this preferable configuration, since the posture or behavior of the valve body becomes stable by the urging force of the urging device, it is possible to suppress the rattling of the valve body.

It may be preferable that the first valve and the second valve are configured in one housing, and the housing may include a first flow path which extends from the inlet to a first chamber driving the second valve and a second flow path which extends from the inlet to a second chamber driving the second valve. According to this preferable configuration, since the first flow path and the second flow path are provided in the housing in which the first valve and the second valve are configured, it is possible to simplify the structure of the switching valve device.

DESCRIPTION OF THE PREFERRED EMBODIMENTS

Modes for carrying out a switching valve device according to the present invention will be described below on the basis of embodiments.

First Embodiment

Figure 5:
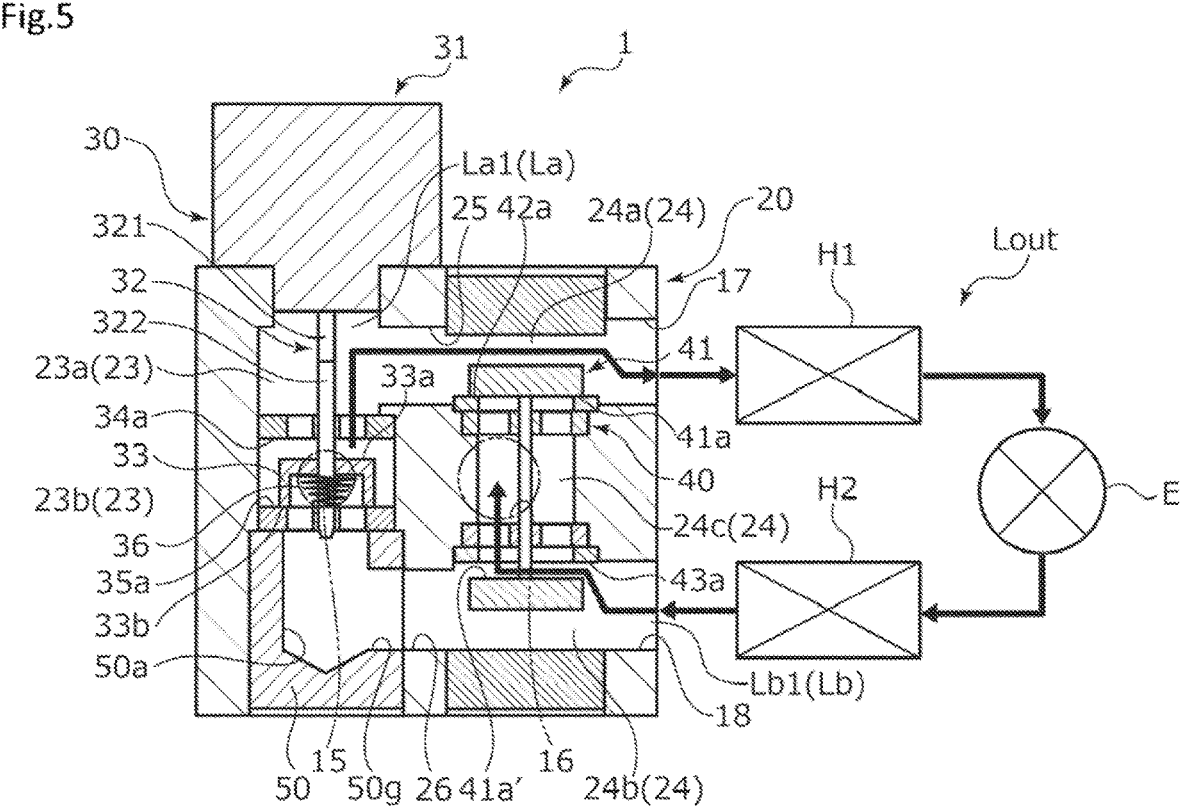
FIG. 5 is a schematic view showing an aspect of the switching valve device during a cold air operation.
Figure 6:
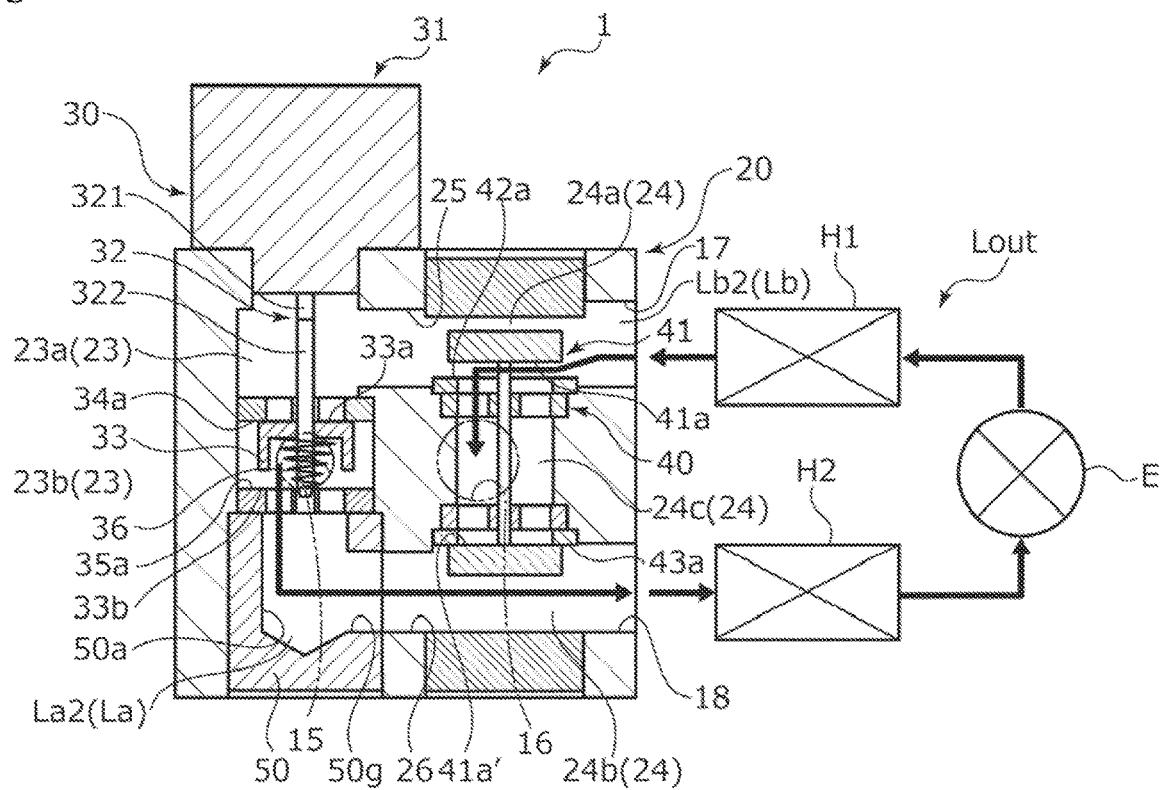
FIG. 6 is a schematic view showing an aspect of the switching valve device during a warm-up operation.

A switching valve device according to an embodiment of the present invention will be described with reference to FIGS. 1 to 6. Hereinafter, the front side of the paper surface in FIG. 3 will be referred to as the front side (sometimes referred to as the front side) of the switching valve device, and the left and right sides of the paper surface in FIG. 3 will be described as the left and right sides of the switching valve device. In addition, FIGS. 5 and 6 are schematically shown in a state in which the cross-sections of the respective flow paths are arranged in the vertical direction for convenience of description.

Figure 1:
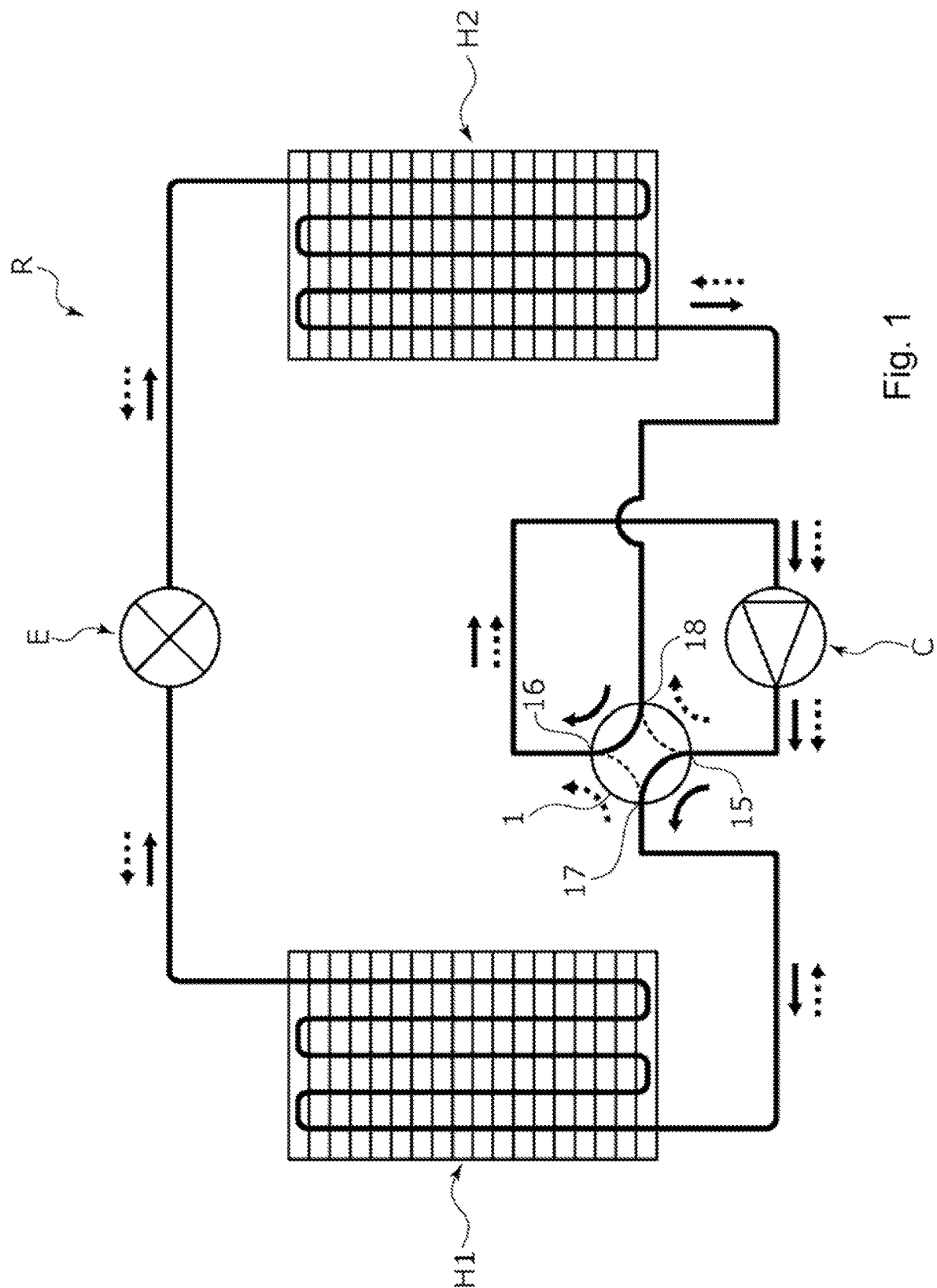
FIG. 1 is a schematic view showing a heat pump incorporating a switching valve device according to a first embodiment of the present invention.

A switching valve device 1 shown in FIG. 1 constitutes, for example, a heat pump R which supplies cold air and warm air in an automobile or the like together with a compressor C, a first heat exchanger H1, an expansion valve E, a second heat exchanger H2, and the like. In addition, the switching valve device 1 may be incorporated, for example, into a fluid circuit in which an actuator operated by a fluid is annularly connected by a flow path.

First, the heat pump R will be described. The switching valve device 1 switches the fluid circuit of the heat pump R (the flow path on the downstream side of the compressor C) so that a heat medium flows in order of the first heat exchanger H1, the expansion valve E, and the second heat exchanger H2 in a cold air operation mode that supplies cold air (see a solid arrow in FIG. 1) and switches the fluid circuit so that a refrigerant flows in order of the second heat exchanger H2, the expansion valve E, and the first heat exchanger H1 in a warm-up operation mode that supplies warm air (see a dashed arrow in FIG. 1). Accordingly, in a cold air operation mode, the first heat exchanger H1 becomes a condenser and the second heat exchanger H2 becomes an evaporator. On the other hand, in a heating operation mode, the second heat exchanger H2 becomes a condenser and the first heat exchanger H1 becomes an evaporator.

Next, a detailed structure of the switching valve device 1 will be described with reference to FIGS. 2 to 4.

Figure 2:
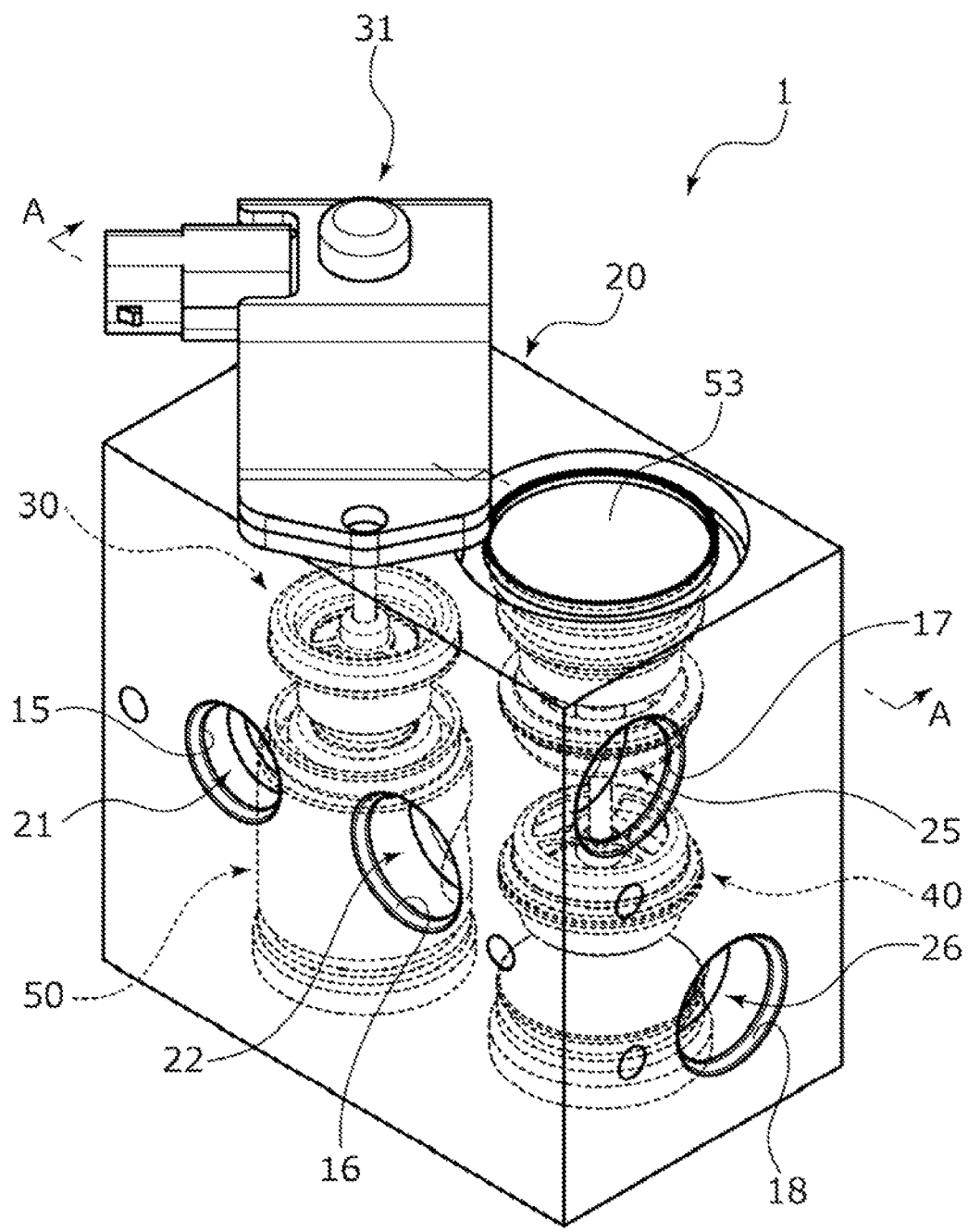
FIG. 2 is a perspective view showing the switching valve device.
Figure 3:
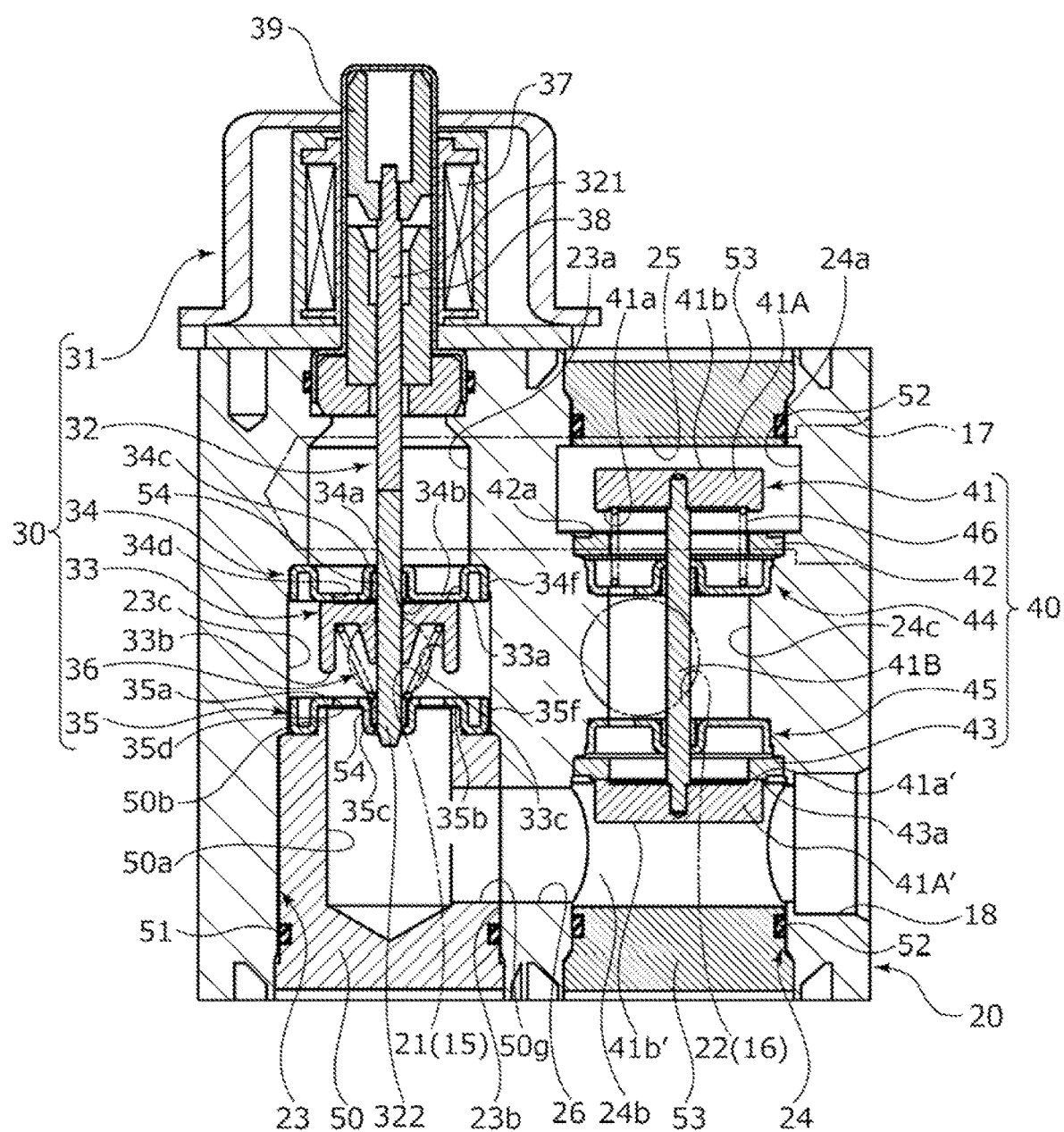
FIG. 3 is a cross-sectional view taken along the line A-A of FIG. 2.

As shown in FIGS. 2 and 3, the switching valve device 1 mainly includes a housing 20 and first and second valves 30 and 40 accommodated in the housing 20. In addition, the switching valve device 1 is a so-called four-way valve to which four flow paths are connected.

The housing 20 is made by carving out a metal material (that is, an ingot) such as aluminum or stainless steel. The housing 20 is provided with a first hole portion 21 and a second hole portion 22 which are formed to extend backward from the front surface of the housing 20 and are separated from each other in the left and right direction. In addition, a front surface opening of the first hole portion 21 constitutes an inflow port 15 and a front surface opening of the second hole portion 22 constitutes an outflow port 16.

Further, the housing 20 is provided with a first through-hole 23 and a second through-hole 24 which are formed in a stepped manner to penetrate in the up and down direction and are separated from each other to the left and right in a parallel state. The first through-hole 23 is formed as a part of the first valve 30 and the second through-hole 24 is formed as a part of the second valve 40. In addition, the second through-hole 24 is provided slightly behind the first through-hole 23.

In the first through-hole 23, the upper portion is formed as a small-diameter hole portion 23a, the lower portion is formed as a large-diameter hole portion 23b, and the vertical intermediate portion is formed as a medium-diameter hole portion 23c. The first hole portion 21 communicates with the medium-diameter hole portion 23c at the front side.

Further, a bottomed tubular holding member 50 that holds a second valve seat member 35 to be described later is press-fitted into the large-diameter hole portion 23b from the lower opening through a seal ring 51 and the lower portion of the large-diameter hole portion 23b is sealed. The holding member 50 is a bottomed tubular member provided with a hole portion 50a opening upward and the tubular portion is provided with a through-hole 50g which penetrates in the left and right direction. Further, the edge of the hole portion 50a is provided with an annular convex portion 50b which protrudes upward and the annular convex portion 50b is disposed in the medium-diameter hole portion 23c.

In the second through-hole 24, the upper portion and the lower portion are formed as large-diameter hole portions 24a and 24b having the same diameter and the vertical intermediate portion is formed as a small-diameter hole portion 24c. The second hole portion 22 communicates with the small-diameter hole portion 24c at the front side.

Lid members 53 are respectively press-fitted into the upper end portion of the upper large-diameter hole portion 24a and the lower end portion of the lower large-diameter hole portion 24b through seal rings 52 and the upper portion and the lower portion of the large-diameter hole portions 24a and 24b are sealed. As will be described in detail later, the large-diameter hole portion 24a functions as a first chamber for driving the second valve 40 and the large-diameter hole portion 24b functions as a second chamber for driving the second valve 40.

Further, the housing 20 is provided with a third hole portion 25 and a fourth hole portion 26 which horizontally extend leftward from the right surface of the housing 20. The third hole portion 25 is disposed on the front surface side of the upper large-diameter hole portion 24a of the second through-hole 24 and the small-diameter hole portion 23a of the first through-hole 23 and communicate with the small-diameter hole portion 23a and the large-diameter hole portion 24a (see also FIGS. 5 and 6). In addition, the right surface opening of the third hole portion 25 constitutes a first input/output port 17.

Further, the fourth hole portion 26 penetrates the lower large-diameter hole portion 24b of the second through-hole 24 and communicates with the hole portion 50a so as to allow the flow to the hole portion 50a through the through-hole 50g of the holding member 50 (see also FIGS. 5 and 6). In addition, the right surface opening of the fourth hole portion 26 constitutes a second input/output port 18.

Next, the first valve 30 will be described. As shown in FIG. 3, the first valve 30 is a solenoid type poppet valve and mainly includes a solenoid portion 31 which drives a rod 32 downward by energizing a coil 37, a valve body 33 which is fixed to the rod 32, a first valve seat member 34 that has a valve seat 34a allowing an upper end surface 33a of the valve body 33 to come into contact therewith, a second valve seat member 35 that has a valve seat 35a allowing a lower end surface 33b of the valve body 33 to come into contact therewith, and a winding spring 36 which urges the valve body 33 upward.

The solenoid portion 31 is fixed to the upper surface of the housing 20 to close the upper opening of the first through-hole 23 and mainly includes the coil 37, a fixed iron core 38, and a movable iron core 39. The rod 32 mainly includes a first shaft member 321 that is fixed to the movable iron core 39, penetrates the fixed iron core 38, and is disposed in the first through-hole 23 and a second shaft member 322 that is connected to the lower end of the first shaft member 321 while a slight relative movement is allowed.

The valve body 33 is formed as a tubular body having an annular concave portion 33c opening downward and the lower end surface 33b of the tubular portion has an annular shape. Further, a protrusion portion which extends downward is formed at the center of the valve body 33 and is formed as the inner wall of the concave portion 33c. The second shaft member 322 of the rod 32 is fixed by welding or press-fitting while being inserted through the center through-hole of the valve body 33 in the up and down direction. Further, the upper end portion of the conical winding spring 36 on the large diameter side is fitted into the concave portion 33c.

The first valve seat member 34 is a pressed product of a plate member and is a member having a substantially M-shaped cross-section including, from the center side to the outer diameter side, a tubular concave portion 34c which opens downward and is provided with a through-hole, a bottom portion 34b which is connected to the tubular concave portion 34c and extends radially outward, and an outer edge portion 34f which has an annular shape and an inverted U-shaped cross-sectional shape and extends upward from the bottom portion 34b.

An annular bearing 54 is disposed in the tubular concave portion 34c and guides the vertical movement of the second shaft member 322.

Further, a plurality of through-holes 34d which penetrate in the up and down direction while leaving the connection portion between the tubular concave portion 34c and the outer edge portion 34f are formed in the bottom portion 34b of the first valve seat member 34. The through-hole 34d allows the communication between the medium-diameter hole portion 23c and the small-diameter hole portion 23a of the first through-hole 23. Further, the lower surface of the outer edge portion of the bottom portion 34b of the first valve seat member 34 is the valve seat 34a.

The first valve seat member 34 is press-fitted into the position of the upper end of the medium-diameter hole portion 23c from below the first through-hole 23 of the housing 20. Since the outer edge portion 34f of the first valve seat member 34 has an inverted U shape, the lower end of the annular vertical piece on the outermost diameter side can be deformed radially inward and hence the outer edge portion can be easily and firmly attached to the housing 20 by press-fitting.

Further, since the first valve seat member 34 is brought into contact with the step portion between the medium-diameter hole portion 23c and the small-diameter hole portion 23a, it is easy to position the first valve seat member 34. In addition, the first valve seat member 34 is not limited to the press-fitting into the medium-diameter hole portion 23c and may be fixed by any fixing device after inserting.

The second valve seat member 35 is a pressed product of a plate member and is a member having a substantially M-shaped cross-section including, from the center side to the outer diameter side, a tubular concave portion 35c which opens upward and is provided with a through-hole, a bottom portion 35b which is connected to the tubular concave portion 35c and extends radially outward, and an outer edge portion 35f which has an annular shape and a U-shaped cross-sectional shape and extends downward from the bottom portion 34b.

The annular bearing 54 is disposed in the tubular concave portion 35c and guides the vertical movement of the second shaft member 322. Further, the lower end portion of the conical winding spring 36 on the small diameter side is placed on the tubular concave portion 35c.

Further, a plurality of through-holes 35d which penetrate in the up and down direction while leaving the connection portion between the tubular concave portion 35c and the outer edge portion 35f are formed in the bottom portion 35b of the second valve seat member 35. The through-hole 35d allows the communication between the hole portion 50a of the holding member 50 and the medium-diameter hole portion 23c of the first through-hole 23. Further, the upper surface of the outer edge portion of the bottom portion 35b of the second valve seat member 35 is the valve seat 35a.

The annular convex portion 50b of the holding member 50 is inserted into the concave portion which is formed by the outer edge portion 35f and the bottom portion 35b of the second valve seat member 35 and opens downward, the outer edge portion of the bottom portion 35b is placed on the annular convex portion 50b, and the bottom portion of the outer edge portion 35f is placed on the upper end surface of the holding member 50, specifically, the upper end surface on the outer diameter side of the annular convex portion 50b. Further, the through-hole 35d of the second valve seat member 35 allows the communication between the hole portion 50a of the holding member 50 and the medium-diameter hole portion 23c of the first through-hole 23.

The second valve seat member 35 is press-fitted into the position of the lower end of the medium-diameter hole portion 23c from below the first through-hole 23 of the housing 20. Since the outer edge portion 35f of the second valve seat member 35 has a U shape, the upper end of the annular vertical piece on the outermost diameter side can be deformed radially inward and hence the outer edge portion can be easily and firmly attached to the housing 20 by press-fitting.

The winding spring 36 is a coil spring which is disposed to surround the protrusion portion of the valve body 33 and the rod 32 and gradually decreases in diameter from the upper end portion toward the lower end portion.

Next, the second valve 40 will be described. As shown in FIGS. 3 and 4, the second valve 40 is a differential pressure driven poppet valve and mainly includes a valve body 41 which is disposed in the second through-hole 24 to be movable in the up and down direction, a first valve seat member 42 with and from which an upper contact surface 41*a* of the valve body 41 is brought into contact and separated, a second valve seat member 43 with and from which a lower contact surface 41*a*' of the valve body 41 is brought into contact and separated, guide members 44 and 45 that guide the movement of the valve body 41, and a spring 46 which is an urging device for urging the valve body 41 upward.

Figure 4:
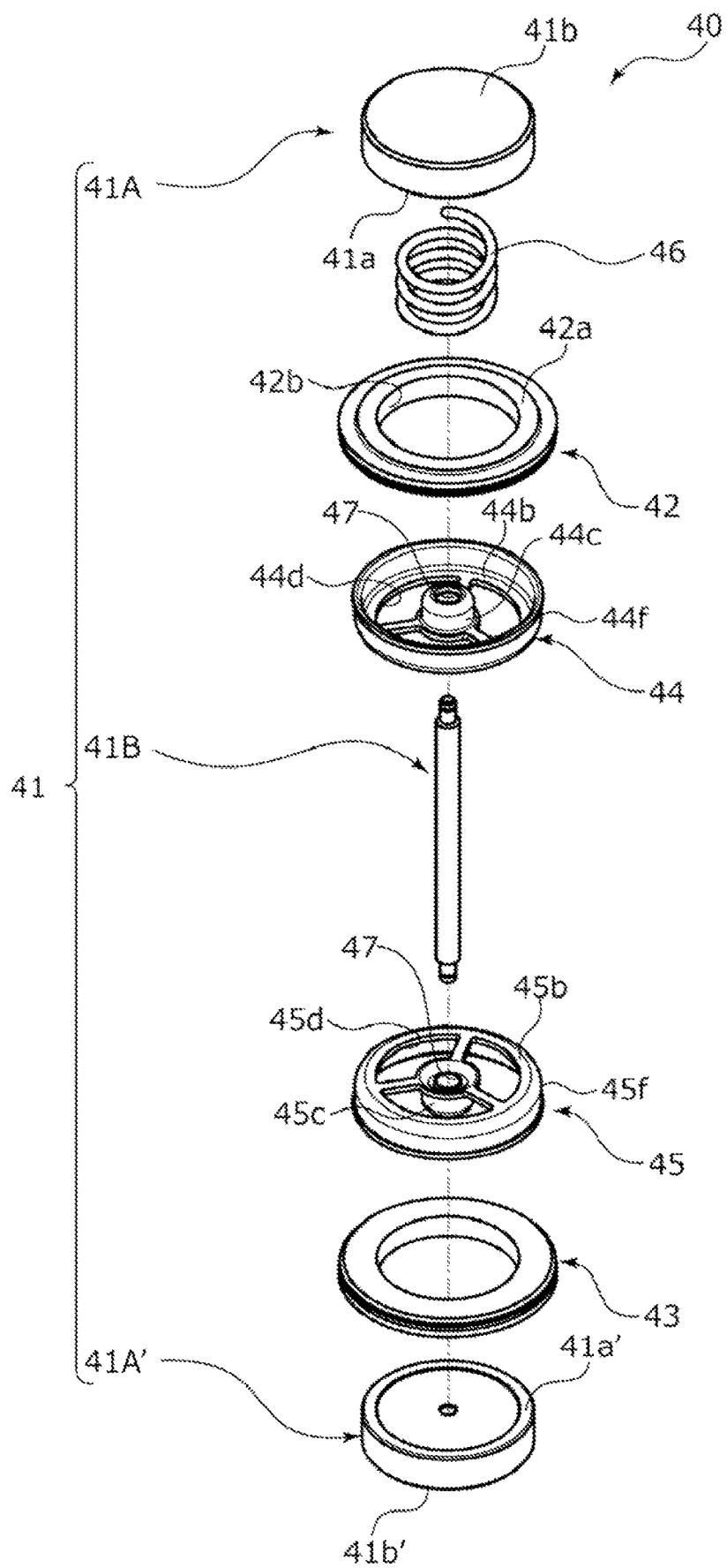
FIG. 4 is an exploded perspective view showing a structure of a second valve.

Particularly, as shown in FIG. 4, the valve body 41 includes a pair of pressure receiving contact portions 41A and 41A' which are vertically disposed to face each other and a connection shaft portion 41B which connects the pressure receiving contact portions 41A and 41A'.

The pressure receiving contact portions 41A and 41A' have a disk shape. In the upper pressure receiving contact portion 41A, the upper surface is provided with a pressure receiving surface 41*b* which receives a fluid pressure from the heat medium in the large-diameter hole portion 24*a* and the lower surface is provided with the contact surface 41*a* which is brought into contact with a valve seat 42*a* of the first valve seat member 42 to be described later.

Further, in the lower pressure receiving contact portion 41A', the lower surface is provided with a pressure receiving surface 41*b*' which receives a fluid pressure from the heat medium in the large-diameter hole portion 24*b* and the upper surface is provided with the contact surface 41*a*' which is brought into contact with a valve seat 43*a* of the second valve seat member 43 to be described later.

As shown in FIGS. 3 and 4, the upper guide member 44 is press-fitted from above the second through-hole 24 and is positioned by being placed on the step portion formed between the large-diameter hole portion 24*a* and the small-diameter hole portion 24*c* of the second through-hole 24.

The guide member 44 is a pressed product of a plate member and is a member having a substantially U-shaped cross-section including, from the center side to the outer diameter side, a tubular concave portion 44*c* which opens downward and is provided with a through-hole, a bottom portion 44*b* which is connected to the tubular concave portion 44*c* and extends radially outward, and an outer edge portion 44*f* which has an annular shape and extends upward from the bottom portion 44*b*. An end portion of the outer edge portion 44*f* is provided with a flange which slightly extends radially outward and hence the strength of the outer edge portion 44*f* becomes high.

An annular bearing 47 is disposed in the tubular concave portion 44*c* and guides the vertical movement of the connection shaft portion 41B. That is, the inclination of the valve body 41 is restricted and the vertical movement is stable.

A plurality of through-holes 44*d* which penetrate in the up and down direction while leaving the connection portion between the tubular concave portion 44*c* and the outer edge portion 44*f* are formed in the bottom portion 44*b* of the guide member 44.

The guide member 44 is press-fitted into the position of the lower end of the large-diameter hole portion 24*a* from above the second through-hole 24 of the housing 20. Since the upper end of the outer edge portion 44*f* of the guide member 44 can be deformed radially inward, the upper end can be easily and firmly attached to the housing 20 by press-fitting.

Further, since the guide member 44 is brought into contact with the step portion between the large-diameter hole portion 24*a* and the small-diameter hole portion 24*c*, it is easy to position the guide member 44. In addition, the guide member 44 is not limited to the press-fitting into the large-diameter hole portion 24*a* and may be fixed by any fixing device after inserting. The first valve seat member 42 is disposed above the guide member 44 in a fixed manner.

The first valve seat member 42 is an annular member and the upper peripheral edge portion of a center through-hole 42*b* is the valve seat 42*a*. In addition, the first valve seat member 42 may be fixed to the guide member 44 or may be fixed to the housing 20.

The through-hole 44*d* of the guide member 44 and the through-hole 42*b* of the first valve seat member 42 allow the communication between the large-diameter hole portion 24*a* and the small-diameter hole portion 24*c* of the second through-hole 24.

Further, the guide member 45 is a pressed product of a plate member and is a member having a substantially U-shaped cross-section including, from the center side to the outer diameter side, a tubular concave portion 45*c* which opens upward and is provided with a through-hole, a bottom portion 45*b* which is connected to the tubular concave portion 45*c* and extends radially outward, and an outer edge portion 45*f* which has an annular shape and extends downward from the bottom portion 44*b*. An end portion of the outer edge portion 45*f* is provided with a flange which slightly extends radially outward and hence the strength of the outer edge portion 45*f* becomes high.

The annular bearing 47 is disposed in the tubular concave portion 45*c* and guides the vertical movement of the connection shaft portion 41B. That is, the inclination of the valve body 41 is restricted and the vertical movement is stable.

Further, a plurality of through-holes 45*d* which penetrate in the up and down direction while leaving the connection portion between the tubular concave portion 45*c* and the outer edge portion 45*f* are formed in the bottom portion 45*b* of the guide member 45.

The guide member 45 is press-fitted into the position of the upper end of the large-diameter hole portion 24*b* from below the second through-hole 24 of the housing 20. Since the lower end of the outer edge portion 45*f* of the guide member 45 can be deformed radially inward, the lower end can be easily and firmly attached to the housing 20 by press-fitting.

Further, since the guide member 45 is brought into contact with the step portion between the large-diameter hole portion 24*b* and the small-diameter hole portion 24*c*, it is easy to position the guide member 45. In addition, the guide member 45 is not limited to the press-fitting into the large-diameter hole portion 24*b* and may be fixed by any fixing device after inserting.

The second valve seat member 43 is disposed below the guide member 45 in a fixed manner. The second valve seat member 43 is an annular member and the lower peripheral edge portion of the center through-hole 43*b* is the valve seat 43a (see FIG. 3). In addition, the second valve seat member 43 may be fixed to the guide member 45 or may be fixed to the housing 20.

The through-hole 45d of the guide member 45 and the through-hole 43b of the second valve seat member 43 allow the communication between the large-diameter hole portion 24b and the small-diameter hole portion 24c of the second through-hole 24.

The spring 46 is a coil spring which is disposed to surround the connection shaft portion 41B, the upper end portion is brought into contact with the pressure receiving contact portion 41A, and the lower end portion is brought into contact with the bottom portion 44b of the guide member 44, so that the valve body 41 is urged upward.

Next, the flow of the heat medium in the cold air operation mode and the warm-up operation mode of the switching valve device 1 will be described with reference to FIGS. 5 and 6. In addition, in FIGS. 5 and 6, the spring 46 is not shown for convenience of description.

As shown in FIG. 5, a first state of the switching valve device 1 set during the cold air operation is realized by the energization state of the solenoid portion 31 of the first valve 30.

When the solenoid portion 31 is energized, the rod 32 presses the valve body 33 downward against the urging force of the winding spring 36 so that the upper end surface 33a of the valve body 33 is separated from the valve seat 34a and the lower end surface 33b of the valve body 33 is brought into contact with the valve seat 35a. Accordingly, the medium-diameter hole portion 23c and the small-diameter hole portion 23a of the first through-hole 23 communicate with each other and the medium-diameter hole portion 23c of the first through-hole 23 and the hole portion 50a of the holding member 50 are closed.

In addition, at this time, since both ends of the upper and lower portions of the second shaft member 322 in the rod 32 are guided by the tubular concave portion 34c of the first valve seat member 34, the tubular concave portion 35c of the second valve seat member 35, and the bearing 54 (see FIG. 3), it is possible to stably move the valve body 33. Additionally, since the first shaft member 321 and the second shaft member 322 of the rod 32 are connected to each other while a slight relative movement is allowed, the first shaft member 321 and the second shaft member 322 can move relative to each other to suppress the influence on the movement of the valve body 33 and prevent the damage of the rod 32 even when the movable iron core 39 (see FIG. 3) is slightly inclined.

The heat medium which flows from the inflow port 15 into the medium-diameter hole portion 23c flows through the small-diameter hole portion 23a of the first through-hole 23, a part of the third hole portion 25, the large-diameter hole portion 24a of the second through-hole 24, the first input/output port 17, the first heat exchanger H1, the expansion valve E, the second heat exchanger H2, the second input/output port 18, and the large-diameter hole portion 24b of the second through-hole 24.

That is, the medium-diameter hole portion 23c (see FIG. 3) and the small-diameter hole portion 23a of the first through-hole 23 and a part of the third hole portion 25 function as a first flow path La1 which extends from the inflow port 15 to the large-diameter hole portion 24a of the second through-hole 24. Further, the first flow path La1 and a second flow path La1 to be described later are two flow paths La which are switched by the first valve 30. In addition, the flow path in which the first heat exchanger H1, the expansion valve E, and the second heat exchanger H2 are arranged constitutes an external flow path Lout of the switching valve device 1.

Accordingly, since the heat medium which is not depressurized by the expansion valve E flows into the large-diameter hole portion 24a of the second through-hole 24 and the heat medium which is pressurized by the expansion valve E flows into the large-diameter hole portion 24b of the second through-hole 24, a pressure difference is generated between the pressure of the large-diameter hole portion 24a and the pressure of the large-diameter hole portion 24b.

Accordingly, the valve body 41 of the second valve 40 is pressed downward, so that the contact surface 41a of the valve body 41 is brought into contact with the valve seat 42a and the contact surface 41a' of the valve body 41 (see FIG. 3) is separated from the valve seat 43a. That is, the large-diameter hole portion 24a and the small-diameter hole portion 24c of the second through-hole 24 are closed, so that the large-diameter hole portion 24b and the small-diameter hole portion 24c of the second through-hole 24 communicate with each other.

Thus, the heat medium which flows into the large-diameter hole portion 24b of the second through-hole 24 passes between the contact surface 41a' of the valve body 41 and the valve seat 43a, flows through the small-diameter hole portion 24c, and flows from the outflow port 16 to the outside of the switching valve device 1 (that is, the compressor C). That is, the large-diameter hole portion 24b of the second through-hole 24, the gap between the contact surface 41a' of the valve body 41 and the valve seat 43a, and the small-diameter hole portion 24c constitute an intermediate flow path Lb1 through which the fluid flows to the outflow port 16.

In addition, since the valve body 41 receives a downward force by the fluid pressure of the heat medium of the large-diameter hole portion 24a, it is possible to maintain a state in which the contact surface 41a is in contact with the valve seat 42a.

On the other hand, as shown in FIG. 6, a second state of the switching valve device 1 which is set during the warm-up operation is realized by the non-energization state of the solenoid portion 31 of the first valve 30.

When the energization of the solenoid portion 31 is stopped, the valve body 33 is pressed upward due to the urging force of the winding spring 36, so that the upper end surface 33a of the valve body 33 is brought into contact with the valve seat 34a and the lower end surface 33b of the valve body 33 is separated from the valve seat 35a. Accordingly, the medium-diameter hole portion 23c and the small-diameter hole portion 23a of the first through-hole 23 are closed, so that the medium-diameter hole portion 23c of the first through-hole 23 and the hole portion 50a of the holding member 50 communicate with each other.

The heat medium which flows from the inflow port 15 into the medium-diameter hole portion 23c flows through the hole portion 50a of the holding member 50, a part of the fourth hole portion 26, the large-diameter hole portion 24b of the second through-hole 24, the second input/output port 18, the second heat exchanger H2, the expansion valve E, the first heat exchanger H1, the first input/output port 17, and the large-diameter hole portion 24a of the second through-hole 24.

That is, the medium-diameter hole portion 23c (see FIG. 3) of the first through-hole 23, the hole portion 50a of the holding member 50, and a part of the fourth hole portion 26 function as a second flow path which extends from the inflow port 15 to the large-diameter hole portion 24b of the second through-hole 24.

Accordingly, since the heat medium which is not depressurized by the expansion valve E flows into the large-diameter hole portion 24b of the second through-hole 24 and the heat medium which is depressurized by the expansion valve E flows into the large-diameter hole portion 24a of the second through-hole 24, a pressure difference is generated between the pressure of the large-diameter hole portion 24a and the pressure of the large-diameter hole portion 24b.

Accordingly, the valve body 41 of the second valve 40 is pressed upward, so that the contact surface 41a of the valve body 41 is separated from the valve seat 42a and the contact surface 41a' of the valve body 41 is brought into contact with the valve seat 43a. That is, the large-diameter hole portion 24b and the small-diameter hole portion 24c of the second through-hole 24 are closed, so that the large-diameter hole portion 24a and the small-diameter hole portion 24c of the second through-hole 24 communicate with each other.

Thus, the heat medium which flows into the large-diameter hole portion 24a of the second through-hole 24 passes between the contact surface 41a of the valve body 41 and the valve seat 42a, flows through the small-diameter hole portion 24c, and flows from the outflow port 16 to the outside (that is, the compressor C) of the switching valve device 1. That is, the large-diameter hole portion 24a of the second through-hole 24, the gap between the contact surface 41a of the valve body 41 and the valve seat 42a (see FIG. 3), and the small-diameter hole portion 24c constitute an intermediate flow path Lb2 through which the fluid flows to the outflow port 16.

In addition, since the valve body 41 receives an upward force by the fluid pressure of the heat medium of the large-diameter hole portion 24b, it is possible to maintain a state in which the contact surface 41a' is in contact with the valve seat 43a.

As described above, since a differential pressure is generated in the first chamber (that is, the large-diameter hole portion 24a) and the second chamber (that is, the large-diameter hole portion 24b) on the downstream side in response to the switching operation in which the first valve 30 switches the flow path to one of the first flow path La (that is, the flow path La1 connected to the medium-diameter hole portion 23c and the small-diameter hole portion 23a of the first through-hole 23 and a part of the third hole portion 25) and the second flow path (that is, the flow path La1 connected to the medium-diameter hole portion 23c of the first through-hole 23, the hole portion 50a of the holding member 50, and a part of the fourth hole portion 26) and the second valve 40 is operated on the basis of the differential pressure to switch an intermediate flow path Lb (that is, the flow path Lb1 in which the large-diameter hole portion 24b of the second through-hole 24, the gap between the contact surface 41a' of the valve body 41 and the valve seat 43a, and the small-diameter hole portion 24c are connected in this order and the flow path Lb2 in which the large-diameter hole portion 24a of the second through-hole 24, the gap between the contact surface 41a of the valve body 41 and the valve seat 42a (see FIG. 3), and the small-diameter hole portion 24c are connected in this order), it is possible to easily switch the intermediate flow path between the flow path on the side of the inflow port 15 and the flow path on the side of the outflow port 16 with a simple structure.

Further, the second valve 40 is a poppet valve including the pair of valve seats 42a and 43a which are disposed to face each other and the valve body 41 which is movable to be brought into contact with one of the pair of valve seats 42a and 43a and to be separated from the other. Accordingly, since the valve body 41 of the second valve 40 receives a force in a valve closing direction by the high fluid pressure of the flow path on the side of the inflow port 15, it is possible to maintain a state in which the valve body is in contact with the valve seat 42a or the valve seat 43a.

Further, the valve body 41 is formed such that the pressure receiving contact portion 41A including the pressure receiving surface 41b and the contact surface 41a provided on the back surface side of the pressure receiving surface 41b faces the pressure receiving contact portion 41A' including the pressure receiving surface 41b' and the contact surface 41a' provided on the back surface side of the pressure receiving surface 41b'. Accordingly, for example, when the pressure receiving surface 41b of the pressure receiving contact portion 41A on the high pressure side receives the fluid pressure so that the contact surface 41a contacts the valve seat 42a, the contact surface 41a' of the pressure receiving contact portion 41A' on the low pressure side is separated from the valve seat 43a and hence the flow path to the outlet can be formed between the contact surface 41a' of the pressure receiving contact portion 41A' on the low pressure side and the valve seat 43a.

Further, since the second valve 40 includes the spring 46 which urges the contact surface 41a' of the pressure receiving contact portion 41A' to come into contact with the valve seat 43a and the contact surface 41a' of the pressure receiving contact portion 41A' comes into contact with the valve seat 43a by the urging force of the spring 46, it is possible to suppress the rattling of the valve body 41. Further, since the valve body 41 is supported by the urging force of the spring 46, it is possible to suppress the valve body from moving downward due to gravity.

In addition, in this embodiment, an embodiment in which the urging force of the spring 46 is applied to the valve body 41 in an upward direction so that the contact surface 41a' of the pressure receiving contact portion 41A' comes into contact with the valve seat 43a has been exemplified, but the urging force of the spring 46 may be applied to the valve body 41 in the downward direction so that the contact surface 41a of the pressure receiving contact portion 41A comes into contact with the valve seat 42a. Furthermore, the rattling of the valve body 41 may be suppressed in such a manner that the spring 46 is disposed between the pressure receiving contact portion 41A of the valve body 41 and the guide member 44 and between the pressure receiving contact portion 41A' and the guide member 45 to apply the urging force to the valve body 41 at both sides in the axial direction.

Further, in this embodiment, a state in which the switching valve device 1 is vertically placed so that the valve body 41 moves in the vertical direction is exemplified, but the switching valve device may be horizontally placed so that the valve body 41 moves in the horizontal direction. In this case, the configuration of the urging device may be omitted, but in order to suppress the rattling of the valve body 41, it is preferable to provide an urging device for urging the valve body in the horizontal direction.

Further, the first valve 30 and the second valve 40 are configured in one housing 20 and the housing 20 includes the first flow path La1 which extends from the inflow port 15 to the large-diameter hole portion 24a driving the second valve 40 and the second flow path La2 which extends from the inflow port 15 to the large-diameter hole portion 24b driving the second valve 40. Accordingly, since the first flow path La1 and the second flow path La2 are provided in the housing 20 storing the first valve 30 and the second valve 40, it is not necessary to prepare a separate member for allowing the communication between the inflow port 15 and the large-diameter hole portions 24a and 24b and it is possible to simplify the structure of the switching valve device 1.

Second Embodiment

Next, a switching valve device according to a second embodiment of the present invention will be described with reference to FIG. 7. In addition, the description of the same configuration as that of the first embodiment and the overlapping configuration will be omitted.

In a switching valve device 100 of a second embodiment, a first valve 300 has a structure different from that of the first valve 30 of the first embodiment and the other parts have the same configuration as that of the switching valve device 1 of the first embodiment.

Figure 7A:
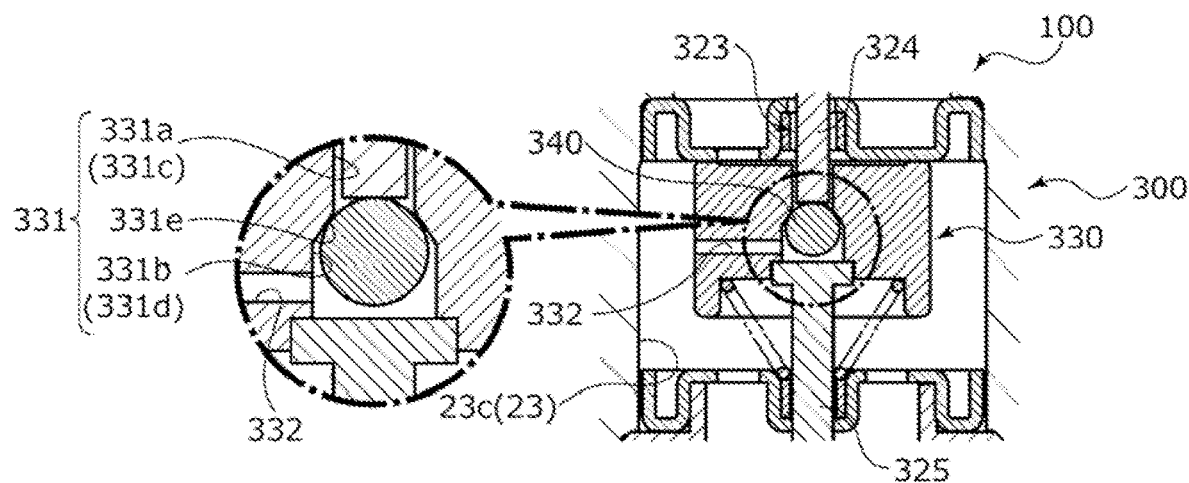
FIGS. 7A to 7C are schematic views showing a behavior of a first valve according to a second embodiment of the present invention.

As shown in FIG. 7A, a valve body 330 of the first valve 300 is provided with a stepped through-hole 331 which is formed at the center portion of the valve body 330 to penetrate vertically and a hole 332 which allows the communication between the through-hole 331 and the medium-diameter hole portion 23c of the first through-hole 23.

In the through-hole 331, a first hole portion 331a which is an upper portion is formed to have a diameter slightly smaller than that of a second hole portion 331b which is a lower portion and a tapered surface 331e is formed between an inner peripheral surface 331c constituting a first hole portion 331a and an inner peripheral surface 331d constituting a second hole portion 331b. Further, the hole 332 extends horizontally so that the medium-diameter hole portion 23c of the first through-hole 23 communicates with the second hole portion 331b.

Further, a second shaft member 323 of the second embodiment is vertically divided by two shaft portions 324 and 325. The upper shaft portion 324 is inserted into the first hole portion 331a of the through-hole 331 from above to be relatively movable. That is, a slight gap is formed between the inner peripheral surface 331c of the first hole portion 331a and the outer peripheral surface of the shaft portion 324.

Further, the lower shaft portion 325 is fixed to the lower surface of the valve body 330 to close the lower portion of the second hole portion 331b of the through-hole 331.

Further, a sphere 340 which is movable in the up and down direction is disposed in the second hole portion 331b of the through-hole 331, that is, a gap between the shaft portions 324 and 325.

As shown in FIG. 7A, in a non-energization state of the solenoid portion 31 (see FIG. 3) (that is, a second state of the switching valve device 100), a high-pressure heat medium which flows into the medium-diameter hole portion 23c of the first through-hole 23 flows into the second hole portion 331b through the hole 332 and the sphere 340 is lifted by the fluid pressure of the heat medium to come into contact with the tapered surface 331e. Accordingly, the first hole portion 331a and the second hole portion 331b are in a non-communication state.

Figure 7B:
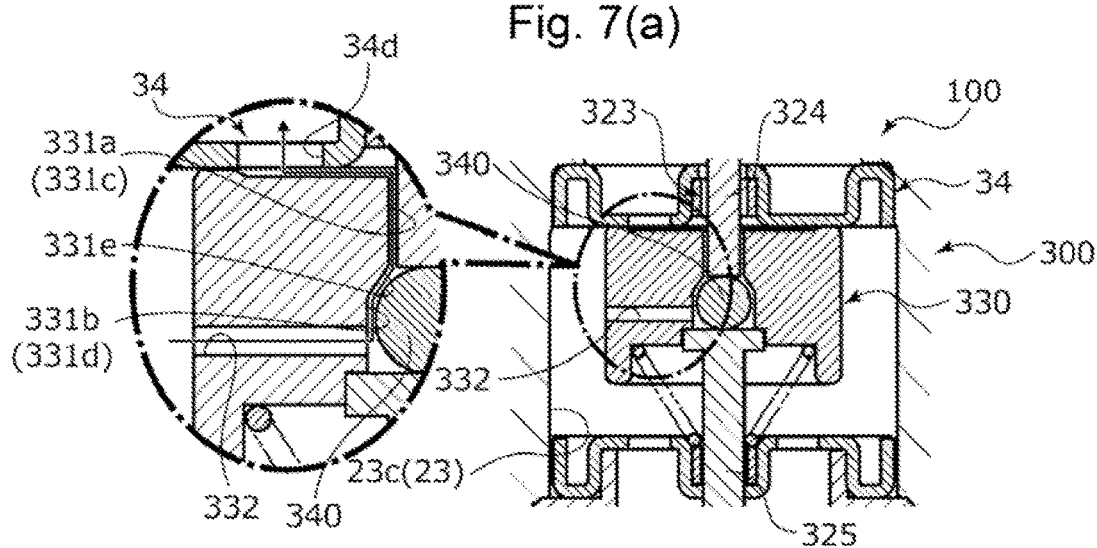

As shown in FIG. 7B, in an initial state in which the solenoid portion 31 is energized (that is, an initial state in which the switching valve device 100 is switched from the second state to the first state), the shaft portion 324 is lowered to slightly press the sphere 340 downward. Accordingly, the sphere 340 and the tapered surface 331e are separated from each other and the heat medium flowing into the second hole portion 331b passes through a gap between the inner peripheral surface 331c of the first hole portion 331a and the outer peripheral surface of the shaft portion 324 and flows from the through-hole 34d of the first valve seat member 34 to the small-diameter hole portion 23a (see FIG. 3) of the first through-hole 23.

Accordingly, the fluid pressure of the heat medium in the medium-diameter hole portion 23c of the first through-hole 23 applied to press the valve body 330 upward decreases and the fluid pressure of the heat medium existing on the upper and lower sides of the valve body 330 approaches a pressure equalization state.

Figure 7C:
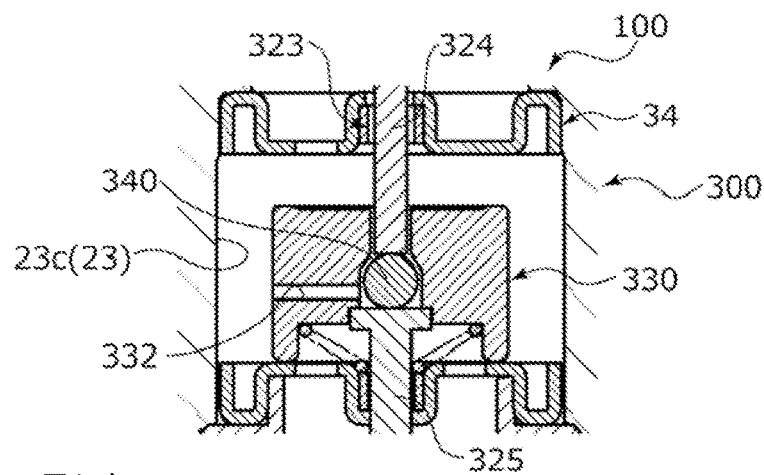

Therefore, as shown in FIG. 7C, the valve body 330 can be pressed downward with a small force to quickly switch the switching valve device 100 from the second state to the first state.

Although the embodiments of the present invention have been described above with reference to the drawings, the specific configuration is not limited to these embodiments and any changes or additions that do not deviate from the scope of the present invention are included in the present invention.

For example, in the first and second embodiments, an embodiment in which the first valve moves the valve body by the linear movement of the rod has been exemplified, but the present invention is not limited thereto. For example, the valve body may be screwed into a rotating shaft that is rotationally driven by a rotating motor so that the valve body can move forward and backward.

Further, in the first and second embodiments, an embodiment in which the first valve is the poppet valve has been exemplified, but the present invention is not limited thereto. For example, the first valve may be a spool valve or a butterfly valve driven by various driving devices.

Further, in the first and second embodiments, an embodiment in which the second valve is the poppet valve has been exemplified, but the present invention is not limited thereto. For example, the second valve may be a spool valve or a butterfly valve driven by a differential pressure.

Further, in the first and second embodiments, an embodiment in which the first valve and the second valve are configured in one housing has been exemplified, but the first valve and the second valve may be configured in different housings.

Further, in the first and second embodiments, an embodiment in which the valve seat of the first valve and the valve seat of the second valve 40 are configured by members separated from the housing has been exemplified, but the valve seats of the first valve and the second valve may be integrally formed with the housing.

Further, in the first and second embodiments, an embodiment in which two intermediate flow paths Lb allowing the communication between the external flow path and the outflow port are provided has been exemplified, but three or more intermediate flow paths may be provided.

Further, in the first and second embodiments, an embodiment in which the pair of valve bodies are provided to face the pressure receiving contact portion has been exemplified, but the present invention is not limited thereto. For example, the valve body may be formed as one columnar member and a pair of facing surfaces thereof may also serve as the pressure receiving surface and the contact surface.

What is claimed is:

1. A switching valve device for switching an intermediate flow path through which a fluid flows from an inlet to an outlet, comprising:
    a first valve which switches a flow path extending from the inlet to one of two flow paths; and a second valve which is provided on a downstream side of the first valve and switches the intermediate flow path by a differential pressure generated by depressurization in an external flow path connected to the intermediate flow path connected to one of the two flow paths, wherein the second valve is a poppet valve including a pair of valve seats which are disposed to face each other in an axial direction and a valve body which is movable to be brought into contact with one of the valve seats and to be separated from remaining one of the valve seats, the valve body includes a pair of pressure receiving contact portion disposed to face to and separate from each other in the axial direction and a connection shaft portion which connects the pressure receiving contact portions, each of the pressure receiving contact portions includes a pressure receiving surface configured to receive a pressure of the fluid inflowing from the inlet and a contact surface which is provided on a back surface side of the pressure receiving surface and comes into contact with each of the valve seats, and the second valve further includes an urging device that is disposed between the pressure receiving contact portions and configured to urge the contact surface of at least one of the pressure receiving contact portions toward one of the valve seats facing the contact surface.

2. The switching valve device according to claim 1, wherein the first valve and the second valve are configured in one housing, and wherein the housing includes a first flow path which extends from the inlet to a first chamber driving the second valve and a second flow path which extends from the inlet to a second chamber driving the second valve.

* * * * *